United States Patent Office 2,760,989
Patented Aug. 28, 1956

2,760,989

PROCESS OF PREPARING DIRESORCYL SULFIDE

Ralph G. D. Moore, Chenango Forks, N. Y., assignor to General Aniline & Film Corporation, New York, N. Y., a corporation of Delaware No Drawing. Application May 15, 1952,
Serial No. 288,062

6 Claims. (Cl. 260—609)

This invention relates to diresorcyl sulfide (4,4'-thiobisresorcinol) and particularly to an improved process of preparing the same.

It is known that phenol and sulfur dichloride may be condensed in the presence of carbon disulfide at a low temperature to yield phenol sulfide. The yield of the phenol sulfide is low and the product is very impure and requires extensive purification. Phenol sulfides can also be prepared by condensing phenols, alkyl phenols, and sulfur dichloride in the presence of ethylene chloride at a temperature ranging from 80–100° C. In the latter process a mixture of sulfides, disulfides, and polymeric bodies are obtained and fractional distillation must be resorted to to separate the crude mixture into the desired products.

Bis-4-resorcinol sulfide (4,4'-thiobisresorcinol) has been prepared by Dunning et al., J. A. C. S. 53, page 3466–9 (1931) by dropping a carbon disulfide solution of sulfur dichloride into an ether solution of resorcinol. This process not only employs temperatures below freezing, i. e., at about —10° C., which are costly to maintain in commercial operations, but also utilizes a poisonous solvent, carbon disulfide. Moreover, despite the low temperatures employed, considerable degradation of the final product occurs.

Diresorcyl sulfide has been isolated by Lefevre and Desgrez (Compt. rend. 198, 1791–3 [1934]) from the reaction products of sulfur, resorcinol, sodium carbonate, and glycerol. The method involved is extremely complicated, time consuming, and expensive. The yields obtained are very small and the final product contains several impurities, principally diresorcyl disulfide. Diresorcyl sulfide has also been prepared by reacting resorcinol and sulfur dichloride in an alkyl ester of a lower fatty acid, i. e., ethyl acetate, at room temperature followed by distillation of the crude reaction mixture. This method has several disadvantages in that the addition of the sulfur dichloride requires very careful control. If it is added too fast or if the temperature is raised above 25° C., a blackening of the reaction mixture occurs which leads to an undesirable colored product. Moreover, the yields obtained are very small, ranging from 0 to 10 per cent.

It is an object of the present invention to provide an improved process of preparing diresorcyl sulfide in satisfactory yields and of higher purity without the presence of degradation products.

Other objects and advantages will become apparent from the following description.

The foregoing objects are accomplished by adding a solution of sulfur dichloride in an alkyl ether to a solution of resorcinol in an alkyl ether at temperatures ranging between 0° and 15° C. The molecular ratio of resorcinol to sulfur dichloride is 2:1. A slight deviation in the amounts of the coreactants will not disturb or hamper the process in any way. Therefore, a slight excess of either one of the reactants may be employed to yield satisfactory results. Within 30 minutes to 1 hour, the condensation reaction is complete and the final product is isolated by any one of the following methods:

(1) Removal of the alkyl ether under reduced pressure, 0–200 mm., and temperature ranging from —25° to 60° C., followed by crystallization from water;

(2) Neutralization of the hydrogen chloride by pouring the reaction solution into sodium carbonate solution or any other aqueous alkali, such as, for example, potassium or lithium carbonate, at temperatures below 25° C., followed by distillation of the ethereal solution at a temperature not exceeding 60° C. and crystallization of the distillation residue from water, the temperature during this operation likewise being kept below 60° C.; and (3) Neutralizaion of the hydrogen chloride followed by extraction of the product into the aqueous phase by the addition of sodium hydroxide, precipitation of the diresorcyl sulfide with an acid, and crystallization from water.

The alkyl ether employed as solvent for the resorcinol and sulfur dichloride is one which has not more than 6 carbon atoms. As examples of such ethers the following are illustrative:

Ethyl methyl ether
Ethyl ether
Ethyl propyl ether
Isopropyl ether
n-Butyl methyl ether Because of the commercial availability and lower cost, I prefer to employ ethyl ether and isopropyl ether. It is not absolutely necessary that the foregoing ethers be anhydrous.

The foregoing processes will be more fully described in conjunction with the following examples. It is to be noted, however, that these examples are given merely by way of illustration and are not to be construed as being limitative.

*Example I*

A solution of 44.0 grams of technical flake resorcinol in 200 ml. of anhydrous ethyl ether was cooled to about 5° C. Over 12 minutes a solution of 20.6 grams technical sulfur dichloride diluted with 40 ml. anhydrous ethyl ether was added with stirring and cooling. The temperature did not exceed 11° C. The sulfur dichloride was rinsed in with 10 ml. of anhydrous ether and the reaction solution kept below 10° C. for 30 minutes. It was then evaporated under reduced pressure until the temperature reached 22° C. at a pressure of 30 mm. The viscous, opaque residue was then treated with a total of 60 ml. of water and reevaporated for about 1½ hours to a temperature of 25° C. and a pressure of 25 mm. The crystalline mass was then warmed to 40–45° C. and transferred to a beaker with rinse water to a total final volume of about 140 ml. The slurry, after being refrigerated overnight, was filtered, the product washed with cold water, and dried under reduced pressure at room temperature. The yield of diresorcyl sulfide was 33.8 grams or 67.6% of the theoretical amount. It melted at 178–181° C. (uncorrected).

*Example II*

The condensation reaction was carried out almost exactly as in Example I. Approximately 80 minutes after all the sulfur dichloride had been added, the reaction solution was run into a stirred solution of 25 grams of sodium carbonate monohydrate in 100 ml. of water at 14–16° C. After being stirred for a few minutes, the mixture was allowed to settle, and the lower aqueous slurry drawn off and discarded. One half the ethereal solution was then subjected to distillation to a bath temperature of 75° C. and 50 ml. of water added while the distillation was continued. The residual aqueous solution was cooled, seeded, and refrigerated for 2 to 3 days, after which it was filtered. The product, which was washed and dried at room temperature under reduced pressure, amounted to 10.5 grams or 42% of the theoretical amount. It was found to melt at 190–193.5° C. (uncorrected).

*Example III*

To a stirred cooled solution of 44.0 grams of technical flake resorcinol in 200 ml. of ethyl ether (not anhydrous), a solution of 20.6 grams technical sulfur dichloride in 45 ml. of anhydrous ethyl ether was added over several minutes at a temperature not exceeding 13° C. After about 1 hour, the cold reaction solution was run into a stirred solution of 25 grams of sodium carbonate monohydrate in about 150 ml. of water at 15–20° C. The lower aqueous layer, which was at a pH of about 7, was removed and the ethereal solution distilled to a bath temperature of 75–80° C. and an internal temperature of 50° C. over a period of 30 minutes. 100 ml. of water was added and the distillation continued about 5 minutes with intermittent stirring to a bath temperature of 80° C. and an internal temperature of 55° C. The receiver was then changed and distillation continued under reduced pressure for about 10 minutes, when the pressure was about 220 mm., the internal temperature 60° C., and the water was distilling over slowly. The residual aqueous solution was cooled, seeded, refrigerated overnight, and filtered when crystallization appeared complete. The washed and dried product, melting at 185–187° C. (uncorrected), amounted to 22 grams for a 44% yield.

*Example IV*

A solution of 309 grams of technical sulfur dichloride in 750 ml. of anhydrous ethyl ether was added over about 1 hour to a stirred solution of 660 grams of technical resorcinol in 3000 ml. of anhydrous ethyl ether and cooled below 12° C. The cold reaction solution was stirred for about 1 hour and then run into a stirred slurry of 558 grams of sodium carbonate monohydrate in about 18 ml. of water at 10–15° C. over 35 minutes. After about 1 hour the volume was increased from about 6 liters to about 8 liters with ice and 670 ml. of a 50% aqueous solution of sodium hydroxide, stirred in together with more ice. The lower aqueous slurry was then run with stirring into 1200 ml. of concentrated hydrochloric acid mixed with about 1500 ml. ice and water. The pH of the mixture was about 6. At this point there were added 200 ml. more of concentrated hydrochloric acid to make the slurry strongly acidic. It was then stirred some time, refrigerated overnight, and filtered. The product, which was washed with water and dried under reduced pressure, amounted to 511 grams or 68.1% of the theoretical amount. It melted, however, in the range 171–ca. 176° C. (uncorrected) and so was recrystallized from three times its weight of hot water. This reduced the yield to 46.5% while the melting range rose to 187.5–189° C. (uncorrected).

*Example V*

About 30 ml. of redistilled isopropyl ether was used to dilute 20.6 grams of technical sulfur dichloride. A significant evolution of heat was observed. This solution was added over 15 minutes to a cold, stirred solution of 44.0 grams of C. P. resorcinol in 200 ml. of isopropyl ether, 20 ml. isopropyl ether being used as a rinse. The temperature did not exceed 10° C. After 2 hours the stirred solution, was treated with a cold solution of 42 ml. of a 50% aqueous solution of sodium hydroxide in about 100 ml. of water. The temperature was kept below 10° C. during this operation. The brown aqueous layer was settled and run into a cold solution of 50 ml. hydrochloric acid and 50 ml. water at a temperature not higher than 11° C. The precipitate, even after being seeded and refrigerated overnight, contained some oil. The product, isolated by filtration and partially dried, was gummy. One half was, therefore, recrystallized from water to give a solid which weighed 10.2 grams for a 40.8% yield. The melting range was low, 174–176° C. (uncorrected). Further recrystallization from water yielded a product having an increased melting point of about 185–187° C.

I claim:

1. The process of preparing diresorcyl sulfide which comprises reacting, at a temperature ranging from 0 to 15° C., sulfur dichloride while dissolved in an alkyl ether containing not more than 6 carbon atoms with resorcinol while dissolved in such an alkyl ether.

2. The process according to claim 1, wherein the reaction is conducted between 5° and 10° C.

3. The process according to claim 1, wherein the reaction is conducted for a period of time ranging from ½ to 1 hour.

4. The process according to claim 1, wherein the solvent is ethyl ether.

5. The process of preparing diresorcyl sulfide which comprises reacting, at a temperature ranging from 0 to 15° C., sulfur dichloride while disolved in an alkyl ether containing not more than 6 carbon atoms with resorcinol while dissolved in such an alkyl ether, removing the alkyl ether at a temperature not exceeding 60° C., and crystallizing the diresorcyl sulfide from water.

6. The process according to claim 5, wherein the isolation of the diresorcyl sulfide is effectuated by neutralization of the reaction solution with an aqueous alkali and removal of the alkyl ether at a temperature not exceeding 60° C., followed by crystallization of the diresorcyl sulfide from water.

References Cited in the file of this patent

Dunning et al.: J. A. C. S., vol. 53, pages 3466–3469, Sept. 5, 1931.